United States Patent

Kemper

[15] 3,666,870

[45] May 30, 1972

[54] SALT BATH FURNACE FOR COPPER RECLAMATION

[72] Inventor: Eugene L. Kemper, Mt. Clemens, Mich.

[73] Assignee: Upton Industries, Inc., Roseville, Mich.

[22] Filed: Apr. 19, 1971

[21] Appl. No.: 135,299

[52] U.S. Cl. .................................... 13/23, 164/281, 266/38
[51] Int. Cl. ........................................................ H05b 3/60
[58] Field of Search ................. 13/23, 235; 164/281; 266/37, 266/38

[56] References Cited

UNITED STATES PATENTS

| | | | |
|---|---|---|---|
| 2,355,761 | 8/1944 | Upton | 13/23 |
| 2,787,592 | 4/1957 | Burkhardt | 13/23 X |
| 3,448,972 | 6/1969 | Derham | 13/23 X |

Primary Examiner—Bernard A. Gilheany
Assistant Examiner—R. N. Envall, Jr.
Attorney—Whittemore, Hulbert & Belknap

[57] ABSTRACT

The invention relates to an electric salt bath furnace for reclamation of copper or other nonferrous metal from ferrous or other higher melting scrap containing the same. A standard type or ceramic lined salt bath furnace having electrodes for passage of current through the bath is provided with an additional electrode at the floor of the furnace. Said electrode has a discharge conduit within the same through which the molten metal is withdrawn, emerging therefrom as solid metal. During initiation of the molten metal discharge, the temperature of the entrance end of the conduit is maintained above the melting point of the metal by the heating effect of the current through the floor electrode. During the casting, the current through the floor electrode is discontinued to avoid overheating and the electrode is discontinued to avoid overheating and the electrode can be water cooled, if necessary. Sensors, preferably thermocouples, are arranged in proximity to said floor electrode to measure the temperature and to control heating and cooling of the metal passing through the discharge conduit.

10 Claims, 3 Drawing Figures

INVENTOR
EUGENE L. KEMPER
BY
Whittemore, Hulbert & Belknap
ATTORNEYS

Patented May 30, 1972

INVENTOR
EUGENE L. KEMPER
BY
Whittemore Hulbert & Belknap
ATTORNEYS 3,666,870

SALT BATH FURNACE FOR COPPER RECLAMATION

BACKGROUND OF THE INVENTION

1. Field of the Invention

The invention relates to the reclamation of copper or other nonferrous metal from scrap materials containing the same in association with ferrous metals or other materials. The reclamation is usually carried out by heating the scrap materials in a furnace to a temperature above the melting point of the nonferrous metal causing it to melt and separate from the solid residue. The accumulated molten metal is then intermittently or continuously discharged in liquid form from the furnace. It has been suggested that a molten salt bath furnace operating at temperatures above 2,000° F can be used for the extraction of molten copper but there are many heretofore unsolved physical and mechanical problems of collecting the molten separated copper from the heated ferrous metal scrap residue and removing same either solid or liquid from the salt bath furnace.

2. Description of the Prior Art

The prior art in salt bath furnaces for melting metals is represented by U.S. Pat. Nos. 2,355,761, 2,820,075, 3,049,570 and 3,085,125.

SUMMARY OF THE INVENTION

The present invention contemplates the modification of a known electric salt bath furnace having submerged electrodes by providing a discharge orifice through which the molten metal can be withdrawn from the furnace. The orifice is formed in a refractory element extending outwardly from the furnace and having an interior passageway through which the molten metal progresses while it changes from the liquid to the solid state. Means is provided for regulating the temperature of the refractory element to control the temperature of the metal discharge during casting and also to initiate the extraction from the furnace. The regulating means includes means for heating the refractory element at least at the orifice end of the interior passageway in order to maintain the metal in the molten condition as it is discharged from the furnace through the orifice into the passageway.

One of the features of the invention is to use the refractory element as an electrode so that the electric current which passes through the electrode into the molten metal and molten salt in the furnace generates sufficient heat to maintain the temperature at the orifice end of the passageway above the melting point of the metal. Means is also provided for water cooling the electrode to regulate the temperature within the passageway where the molten metal changes from the liquid to the solid state as it progresses through the refractory element.

Thermocouples or other temperature sensors are provided in proximity to the refractory electrode to measure the temperature so that the heating and cooling of the electrode can be controlled as necessary for withdrawal of the molten metal in solid form.

An important advantage in using an electrode as the means providing the discharge passageway is that it provides a simple way of heating the passageway at will either to prevent freezing of the molten metal within the passageway or to cause remelting of solidified metal following shutdown of the furnace.

DRAWINGS

FIG. 1 is a plan view of the furnace.
FIG. 2 is a sectional elevation on line 2—2 of FIG. 1.
FIG. 3 is an end view.

DESCRIPTION OF A PREFERRED EMBODIMENT

Figure 1:
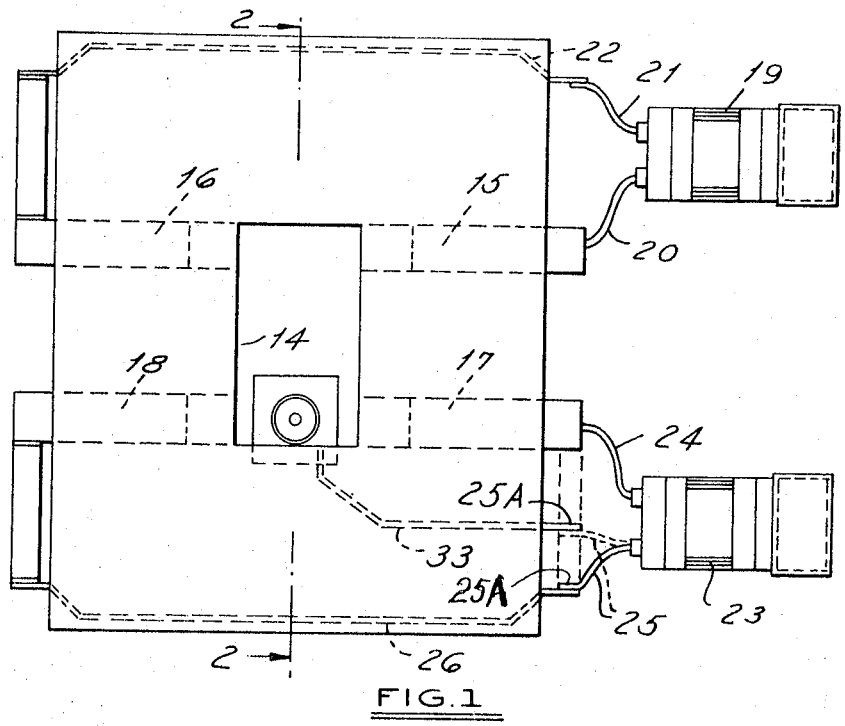
Figure 3:
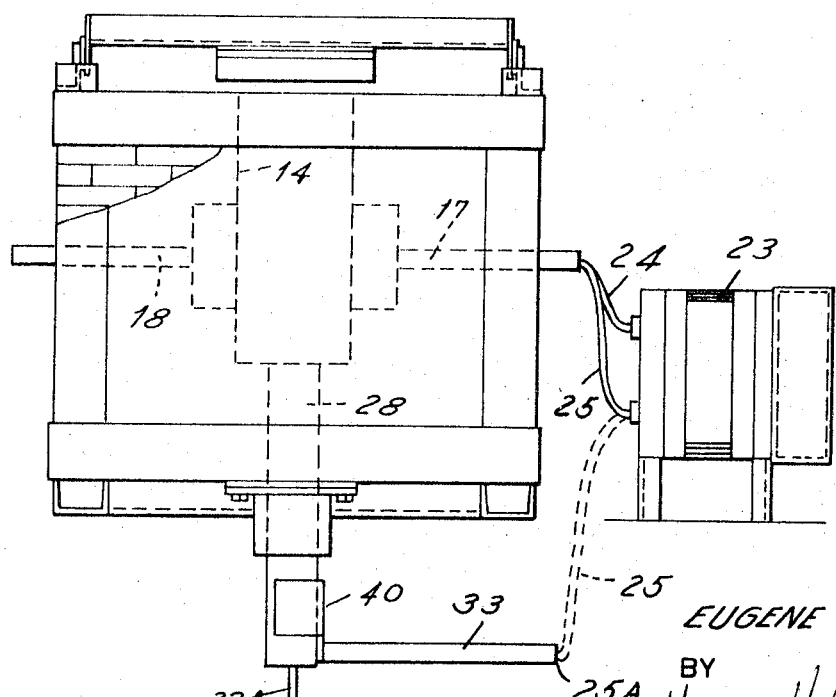
Figure 2:
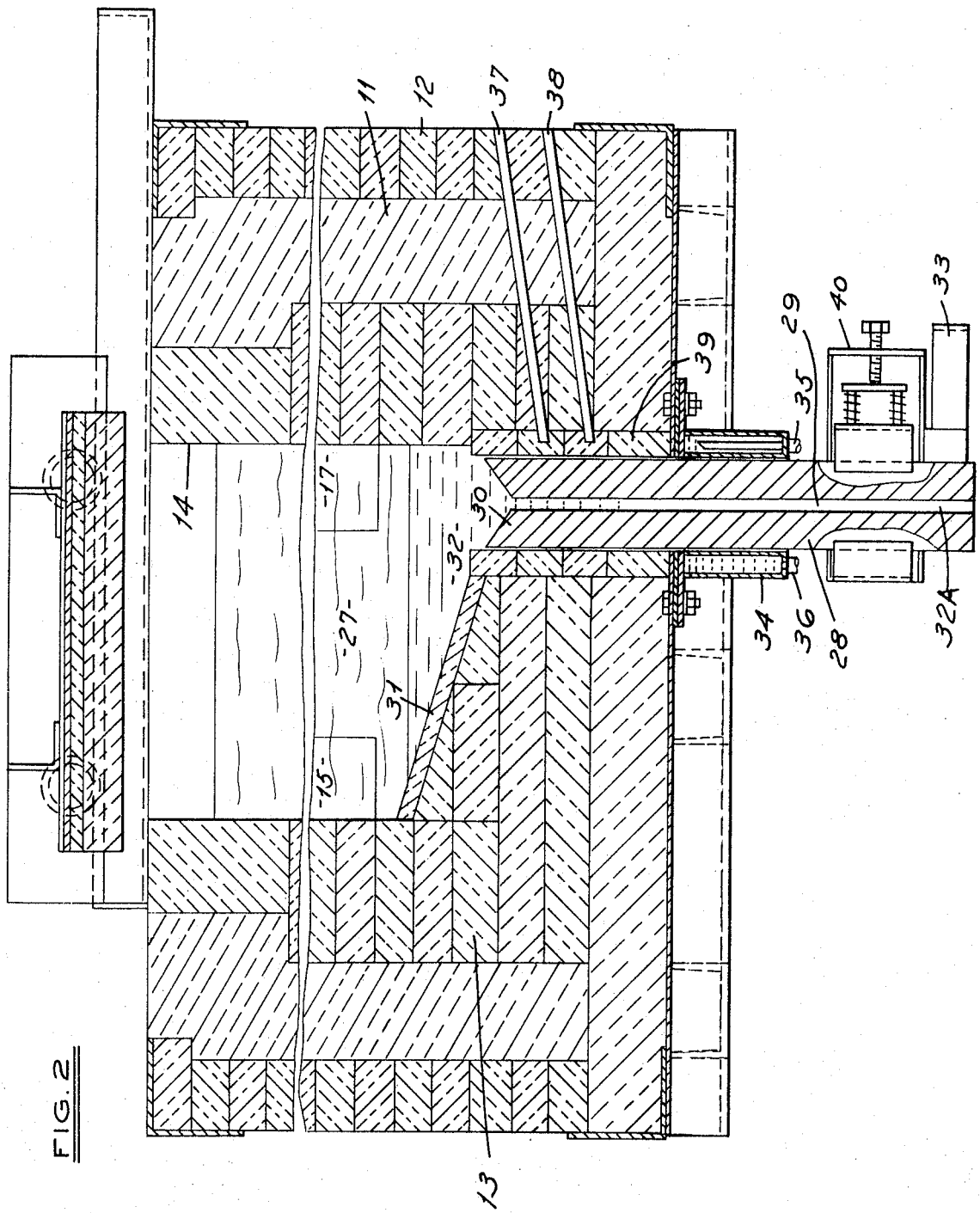

The molten salt bath furnace has a monolithic ceramic wall 11, outer brick walls 12 and interior brick walls 13. The inner brick portion is built to provide a central salt chamber 14 rectangular in horizontal section. Near the bottom of the chamber are the electrodes arranged in pairs 15, 16 and 17, 18, respectively. A transformer 19 has flexible conductor 20 leading to electrode 15, and flexible conductor 21 leading to the opposite electrode 16 by means of an intermediate electrical connector 22. A second transformer 23 has a flexible conductor 24 leading to electrode 17 and a flexible conductor 25 which is normally attached at 25A to an intermediate electrical connector 26 leading to electrode 18. The salt bath 27 is maintained in molten condition at the desired temperature above the melting point of the metal by the passage of electric current through the molten salt between the ends of the pairs of electrodes. Thus far, the furnace as described is a conventional electric molten salt bath furnace.

For the reclamation of the metal which is melted in the furnace, the bottom of the salt chamber 14 is provided with an orifice electrode 28 having a central passageway 29 through which the molten metal can be downwardly discharged. The top end of this electrode has a conical depression 30 and the chamber has a sloping hearth 31.

The present invention contemplates that the separated molten metal 32 which accumulates in the bottom of the chamber beneath the molten salt 27 will be withdrawn through the orifice 29 in the electrode 28 and emerge at the bottom thereof in the form of a solid metal rod 32A. The discharge of the molten metal and emergence as a solid rod constitutes a form of continuous casting and thus requires the proper temperature control in the passageway through which the metal changes from liquid to solid.

According to the present invention, temperature control is accomplished by providing both heating and cooling means for the orifice electrode 28. Heating is accomplished by electrically connecting the orifice electrode 28 to the transformer 23 so that the current normally passing through the molten salt between electrodes 17 and 18 is caused to pass between electrodes 17 and 28. This can be accomplished by disconnecting attachment 25A of the flexible conductor 25 from electrical connector 26 and fastening the attachment 25A to the electrical connector 33 which leads to the bottom of electrode 28. Conventional clamping means 40 is provided at electrode 28 as is standard practice for conducting electric current to a refractory electrode. The orifice electrode 28 generates heat due to its ohmic resistance and also by the fact that the molten metal acts as an extension to the electrode to the salt bath which brings heat to the surface of the molten metal and thence by conduction to the electrode 28. The cooling of the orifice electrode 28 is accomplished by providing the cooling jacket 34 through which coolant liquid is circulated from inlet and outlet pipes 35 and 36.

In order to determine the amount of heating and cooling to be provided, sensors 37 and 38, preferably thermocouples, are placed in the brick wall 39 surrounding electrode 28 at longitudinally spaced distances. From the temperature measurement it can be determined how to regulate the heating and cooling to maintain optimum casting conditions. The melt/freeze zone within the conduit 29 where the discharged metal changes from liquid to solid must be controlled as a function of the extraction rate. If casting is interrupted or stopped for whatever reason, it is important that the orifice electrode can be sufficiently heated so that the process can be started again without damage to the equipment.

To initiate the extraction of the metal from the furnace through the conduit 29, the temperature of the orifice, as monitored by the sensors, is raised above the freezing point of the metal. After establishing the proper temperature at this point in the passageway, the metal is advanced, as in conventional continuous casting.

In the above description, the furnace has been described for use in reclaiming various metals, but the invention is particularly adapted for reclaiming copper from ferrous metals of higher melting points with which it is commonly associated in scrap such as electric motor armatures.

The orifice electrode 28 must be of an electrically conductive material sufficiently refractory to withstand the temperature and chemical action of the molten metal and to be reasonably resistant to abrasion by the passage of the solidified metal therethrough. A suitable material is graphite, but silicon carbide, or other equivalent material may be substituted for graphite.

In the broader aspects of the invention, the orifice electrode can alternatively be a refractory metal such as molybdenum, zirconium, or a refractory alloy or a cermet material.

The salt used for the furnace is one which melts below the melting point of copper or other metal to be extracted and has a specific gravity less than that of the metal so that the metal to be reclaimed is accumulated in the molten state below the molten salt.

What I claim as my invention is:

1. A salt bath furnace for reclaiming metal from scrap materials comprising a ceramic body having a chamber therein containing molten salt, means for maintaining the molten salt at a temperature higher than the melting point of the metal to be reclaimed, thereby melting the metal to be reclaimed and accumulating the same in a liquid state, a refractory member extending into the accumulated molten metal and having a passageway for discharging molten metal from the furnace, means for heating said refractory member to maintain the temperature at the entrance end of said passageway above the melting point of the metal to facilitate discharge of the metal thereinto in the molten state, and means for cooling said refractory member to solidify the molten metal during its movement through said passageway whereby it is withdrawn therefrom in the solid state.

2. A salt bath furnace according to claim 1 in which said refractory member is one of a pair of electrodes and said means for heating said refractory member is provided by the passage of electric current from said refractory electrode through the molten metal and the molten salt to the other of said pair of electrodes.

3. A salt bath furnace according to claim 1 wherein the means for maintaining the temperature of the molten salt is provided by electrodes extending into the salt and the means for heating said refractory member is provided by the selective passage of current into said molten salt through said refractory member.

4. A furnace according to claim 3 in which means is provided for switching the electric current from one of said electrodes in direct contact with the molten salt to said refractory electrode in contact with the molten metal.

5. A furnace for melting and casting comprising a ceramic body having a chamber therein containing a molten salt bath for receiving the metal to be melted by contact with the bath, said molten salt having a specific gravity lower than the molten metal so that the latter sinks to the floor of the chamber, electrodes in contact with the molten salt, an electric supply for passing current from said electrodes through the bath, a refractory member extending downwardly from the floor of said chamber having a vertical conduit therein for discharge of molten metal, and means for heating said refractory member to maintain the temperature of the entrance to said conduit above the melting point of said metal.

6. A furnace according to claim 5 in which said refractory member is one of a pair of electrodes and said means for heating said refractory member is provided by the passage of electric current between said electrodes through the molten metal and the molten salt.

7. A furnace according to claim 6 in which means is provided for switching the electric current from one of said electrodes in direct contact with the molten salt to said refractory electrode in contact with the molten metal to thereby raise the temperature of the discharge conduit in said refractory electrode.

8. A furnace according to claim 7 having means for cooling said refractory member to prevent overheating during discharge of metal therethrough.

9. A furnace for melting and casting comprising a ceramic body having a chamber therein containing a molten salt bath for receiving the metal to be melted by contact with the bath, said molten salt having a specific gravity lower than the molten metal so that the latter sinks to the floor of the chamber, electrodes in contact with the molten salt, an electric supply for passing current from said electrodes through the bath, an orifice electrode extending downwardly from the floor of said chamber having a vertical conduit therein for discharge of molten metal, and means selectively passing current into said molten salt through said orifice electrode to maintain the temperature of the entrance to said conduit above the melting point of said metal.

10. A furnace according to claim 9 having means for cooling said orifice electrode to prevent overheating during discharge of metal therethrough.

* * * * *